US005953902A

United States Patent [19]

Jerye et al.

[11] Patent Number: 5,953,902

[45] Date of Patent: Sep. 21, 1999

[54] CONTROL SYSTEM FOR CONTROLLING THE ROTATIONAL SPEED OF A TURBINE, AND METHOD FOR CONTROLLING THE ROTATIONAL SPEED OF A TURBINE DURING LOAD SHEDDING

[75] Inventors: Bernhard Jerye, Görlitz; Alfred Schwope, Erlangen, both of Germany

[73] Assignee: Siemens Aktiengesellschaft, Munich, Germany

[21] Appl. No.: 09/018,143

[22] Filed: Feb. 3, 1998

Related U.S. Application Data

[63] Continuation of application No. PCT/DE96/01342, Jul. 22, 1996.

[30] Foreign Application Priority Data

Aug. 3, 1995 [DE] Germany ............................ 195 28 601

[51] Int. Cl.[6] ........................................ F02C 9/28

[52] U.S. Cl. ........................................ 60/39.281

[58] Field of Search ............................ 60/39.03, 39.182, 60/39.281

[56] References Cited

U.S. PATENT DOCUMENTS

| | | | |
|---|---|---|---|
| 4,195,231 | 3/1980 | Reed et al. | 60/39.182 |
| 4,280,059 | 7/1981 | Zickwolf, Jr. . | |
| 4,922,710 | 5/1990 | Rowen et al. | 60/39.281 |

FOREIGN PATENT DOCUMENTS

| | | |
|---|---|---|
| 1296657 | 6/1969 | Germany . |
| 2627591 | 12/1977 | Germany . |
| 2011126 | 7/1979 | United Kingdom . |

*Primary Examiner*—Louis J. Casaregola
*Attorney, Agent, or Firm*—Herbert L. Lerner; Laurence A. Greenberg

[57] ABSTRACT

A control system for controlling the rotational speed of a turbine for producing electrical power and a method for controlling the rotational speed of a turbine during load shedding include a control structure. The control structure can be connected to an actuator, which is used to control the rotational speed, and the control structure is used to control the rotational speed of the turbine during idling and/or insular operation of the turbine. An error signal which is dependent on a difference between a setpoint value and an actual value of the rotational speed, can be supplied to the control structure. During load shedding, the control structure supplies a closing signal to the actuator as a function of the error signal. The control structure combines the function of controlling the rotational speed during idling and/or insular operation of the turbine with the function of avoiding rapid shutdown of the turbine when load shedding occurs.

3 Claims, 2 Drawing Sheets

CONTROL SYSTEM FOR CONTROLLING THE ROTATIONAL SPEED OF A TURBINE, AND METHOD FOR CONTROLLING THE ROTATIONAL SPEED OF A TURBINE DURING LOAD SHEDDING

CROSS-REFERENCE TO RELATED APPLICATION

This application is a continuation of International Application PCT/DE96/01342, filed Jul. 22, 1996, which designated the United States.

BACKGROUND OF THE INVENTION

Field of the Invention

The invention relates to a control system for controlling the rotational speed of a turbine for producing electrical power, including a first control structure for controlling the rotational speed during idling and/or insular operation of the turbine. The invention also relates to a method for controlling the rotational speed of a turbine during load shedding.

In the case of turbines, in particular turbogenerator sets for producing electrical power, it is frequently necessary for operational reasons to prevent rapid shutdown during load shedding, that is to say while the electrical power to be emitted is being reduced. Rapid shutdown of the turbine occurs, for example, if the rotational speed of the turbine after load shedding exceeds a critical value, for example 10% of the nominal rotational speed. The special control-engineering measures required for prevention can be implemented by the use of additional so-called sudden load-change devices. Those sudden load-change devices cause a control valve which controls the rotational speed to close immediately during load shedding, with the period for which the control valve is kept closed being dependent on the magnitude of the load shed, that is to say on the reduction in the electrical power produced by the turbine and the associated generator. After that period has elapsed, the control of the rotational speed is taken over by the rotational-speed controller of the turbine. That controls the rotational speed during idle operation and during insular operation of the turbine, that is to say in the case in which no electrical power is being emitted to a power supply network. During network or on-line operation, in which electrical power is emitted to a power supply network, the turbine is coupled to the generator, so that the rotational speed of the turbine is governed by the nominal rotational speed (synchronous rotational speed) and the rotational-speed controller is used to control, for example, the fuel supply in the case of a gas turbine or the steam supply in the case of a steam turbine.

German Published, Prosecuted Patent Application 1 296 657 describes an electro-hydraulic controller for the fresh-steam valve of a steam turbine. The fresh-steam valve is controlled by an opening controller, as a function of its position. A parameter which is dependent either on the rotational speed or on the power is used as the setpoint value for control purposes. Pure control of the rotational speed is carried out in the event of load shedding, that is to say when the synchronous generator is suddenly disconnected from the joint network. A sudden load-change relay, which is not described in more detail, is used for that purpose.

Published UK Patent Application GB 2 011 126 A, corresponding to U.S. Pat. No. 4,238,924, describes a control system of a gas turbine. In that control system, a fuel supply valve is controlled by a PI controller. That control system operates in pure network operation of the gas-turbine system and is constructed in such a way that it ensures appropriate follow-up in the event of load changes. Such control systems have an inherent conflict which is that the integral part requires a long time constant for good control quality and, in contrast, requires a short time constant in order to react as quickly as possible to a change in the load on the gas turbine. The selected time constant of the integrator part results in undesirable fluctuations in the rotational speed of the turbine even if an additional fuel return valve is added, through which fuel is fed back in the event of a load change, and the quantity of fuel flowing into the combustion chamber is thus reduced. Rapid matching of the fuel flow rate to the rotational speed required after a load change, that is to say stabilizing the rotational speed at the required constant rotational speed as quickly as possible, is carried out by superimposing a constant signal on the rotational-speed difference signal. That speeds up the response of the integrator to the difference signal. The rotational-speed difference signal is applied continuously to the function generator, in order to control the rotational speed. The function generator thus reacts to a change in the rotational speed, corresponding to the rotational-speed difference signal which differs from zero, in such a way that the fuel flow rate being supplied is reduced through the fuel supply valve.

German Published, Non-Prosecuted Patent Application 26 27 591, corresponding to U.S. Pat. No. 4,146,270, specifies a control device for turbines having a rotational-speed controller and a power controller. The two controllers are connected to a minimum selection structure and are slaved to one another during network operation of the turbine. The respectively smaller value of the rotational-speed controller or of the power controller is selected by the minimum selection structure and is supplied to a proportional element, which produces a valve control value. The rotational-speed controller is constructed in such a way that, if a sudden load disconnection takes place, the resultant increase in the rotational speed of the turbine is kept small such that, in particular, a rise of only about 1% of the operating rotational speed occurs. As a single specifically described embodiment, a rotational-speed controller is specified which has a proportional element, an integral element and a differential element. When there is no load on the turbine from the generator, the output of the rotational-speed controller is immediately driven downwards through the differential element, and the turbine is stabilized at a fixed speed of revolution. The speed of revolution, which rises in the event of load shedding, is thus immediately reduced again by the differential section. To that end, the mains frequency is supplied directly to the adifferential section as a signal, and the difference between the required frequency and the mains frequency is supplied only to the proportional section and the integral section.

SUMMARY OF THE INVENTION

It is accordingly an object of the invention to provide a control system for controlling the rotational speed of a turbine and a method for controlling the rotational speed of a turbine during load shedding, which overcome the hereinafore-mentioned disadvantages of the heretofore-known devices and methods of this general type and in which the control system is constructed to be standard and simple without any additional sudden load-change device for a turbine and prevents rapid shutdown of the turbine during load shedding.

With the foregoing and other objects in view there is provided, in accordance with the invention, a control system for controlling the rotational speed of a turbine for producing electrical power, comprising a first control structure for receiving an error signal unambiguously dependent on a difference between a setpoint value and an actual value of a rotational speed, the first control structure including a PI controller having a P controller and an I controller, the P controller having a proportionality constant great enough to cause an output signal of the I controller to assume a value zero upon application of an error signal having a minimum predeterminable magnitude; and an actuator to be connected to the first control structure for controlling the rotational speed; the first control structure controlling the rotational speed during idle and/or insular operation of the turbine, and the first control structure connected with the actuator and feeding a closing signal to the actuator during load shedding.

The control system having the first control structure ensures that it is possible to drive the actuator without any delay, without any additional devices or electrical circuits. In consequence, the increase in rotational speed which occurs in the event of load shedding is limited to a permissible level, that does not cause rapid shutdown.

The PI controller is suitable both for control of the rotational speed of the turbine during idling and/or insular operation and for controlling the actuator, so that after load shedding, the actuator is immediately moved by a closing signal to a position which can be preset. The actuator remains in this position for a time period which is governed by the magnitude of the load being shed and, after this time period, it is stabilized, by a rise in the output signal of the first control structure, at a position which is required for the idling and/or insular operation.

An appropriate error signal can result in the integrator integrating down to the value zero and remaining at that value during network operation of the turbine. This is achieved, for example, due to the fact that although the first control structure does not drive the actuator during normal network operation, it continuously receives an error signal other than zero, as a result of which the first control structure is in an overdriven state. The output signal of the first control structure is limited by a maximum output signal value, which can be preset. This maximum output signal value is dominated by the output signal of the P controller. If the proportionality constant K1 of the P controller in this case is selected in such a way that the product of the proportionality constant and the error signal is greater than or equal to the maximum output signal of the first control structure, then the output signal of the I controller is automatically limited to zero. This ensures that, when load shedding occurs, the integral element of the first control structure is at the value zero. Through likewise resetting the error signal to the value zero, the first control structure supplies an output signal, which is likewise at the value zero, immediately after the load shedding occurs. This "zero" output signal is thus also applied to the actuator immediately after the load shedding. The actuator in consequence and without delay assumes its preset position, in particular a closed position. The error signal is, for example, made to be zero by the setpoint value of the rotational speed being set precisely to the value of the synchronous rotational speed, which corresponds to the actual value of the rotational speed during network operation and when load shedding occurs.

After load shedding, that is to say disconnection of the generator with the turbine changing over to idling and/or insular operation, the rotational speed is controlled through the first control structure. The time period in which the actuator remains in that position, in particular a closed position, which can be preset, is dependent on the magnitude of the load being shed, and in particular it is proportional thereto. The first control structure carries out control of the rotational speed in such a manner that the preset setpoint value, in particular the synchronous rotational speed of the turbine, is reached. After load shedding, the rotational speed of the turbine rises above the synchronous rotational speed, and falls again after reaching a maximum value. As soon as the rotational speed has fallen below the synchronous rotational speed, the actuator is driven through the first control structure, for example by a control valve being opened again, so that the rotational speed is matched to the synchronous rotational speed as a function of the parameters and of the control algorithm (PI algorithm) of the first control structure.

In accordance with another feature of the invention, in order to ensure a constant rotational speed from the changeover from idling and/or insular operation to network operation, the control system preferably has a second control structure and a correction value structure. The correction value structure is connected to the first control structure and to the second control structure in such a way that the output signal of the second control structure is slaved to the value of the output signal of the first control structure during idling and/or insular operation. In consequence, the output signals of the first control structure and of the second control structure are identical at all times during idling and/or insular operation, so that the same output signal is supplied to the actuator during a changeover to network operation, with the actuator being connected to the second control structure in network operation and being connected to the first control structure in insular operation.

With the objects of the invention in view, there is also provided a method for controlling the rotational speed of a turbine during load shedding, which comprises providing a first control structure including a PI controller having an I controller; supplying an error signal during network operation of the turbine to the first control structure for controlling the rotational speed during idling and/or insular operation of the turbine and causing an output signal of the I controller to assume a value zero; setting the error signal to a value zero when load shedding occurs; and supplying an output signal of the PI controller to an actuator connected to the first control structure during load shedding for controlling the rotational speed.

The method has the advantage of using the rotational speed in a single control structure both during idling and/or insular operation and during load shedding in order to avoid rapid shutdown of the turbine. A suitable selection of parameters of the PI controller ensures that the first control structure is overdriven by the error signal which is applied to the first control structure during network operation, in such a way that the magnitude of the element of the I controller in the output signal of the first control structure is zero.

When load shedding occurs, during which, for example, the generator is disconnected from the turbine and the control for an actuator of the turbine is switched over to the first control structure and the error signal is likewise set to zero, the output signal of the first control structure is given by the P controller. This likewise supplies an output signal at the value zero when the "zero" error signal is applied, so that the actuator, which is driven by the output signal, moves without delay to a position that can be preset.

In accordance with another mode of the invention, the actuator is, for example, a control valve which moves to a minimal open position when an input signal at the value zero is applied, such that the rotational speed of the turbine is limited to a value which is below the maximum permissible value. Rapid shutdown of the turbine is thus effectively aprevented during load shedding.

In accordance with a concomitant feature of the invention, the method is suitable for both gas turbines and steam turbines. The actuator, which is driven by the first control structure, is a control valve in a gas turbine, and the control valve is used to control the fuel supply. In the case of a steam turbine, the actuator is a control valve which is used to control the steam supply. Other features which are considered as characteristic for the invention are set forth in the appended claims.

Although the invention is illustrated and described herein as embodied in a control system for controlling the rotational speed of a turbine and a method for controlling the rotational speed of a turbine during load shedding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
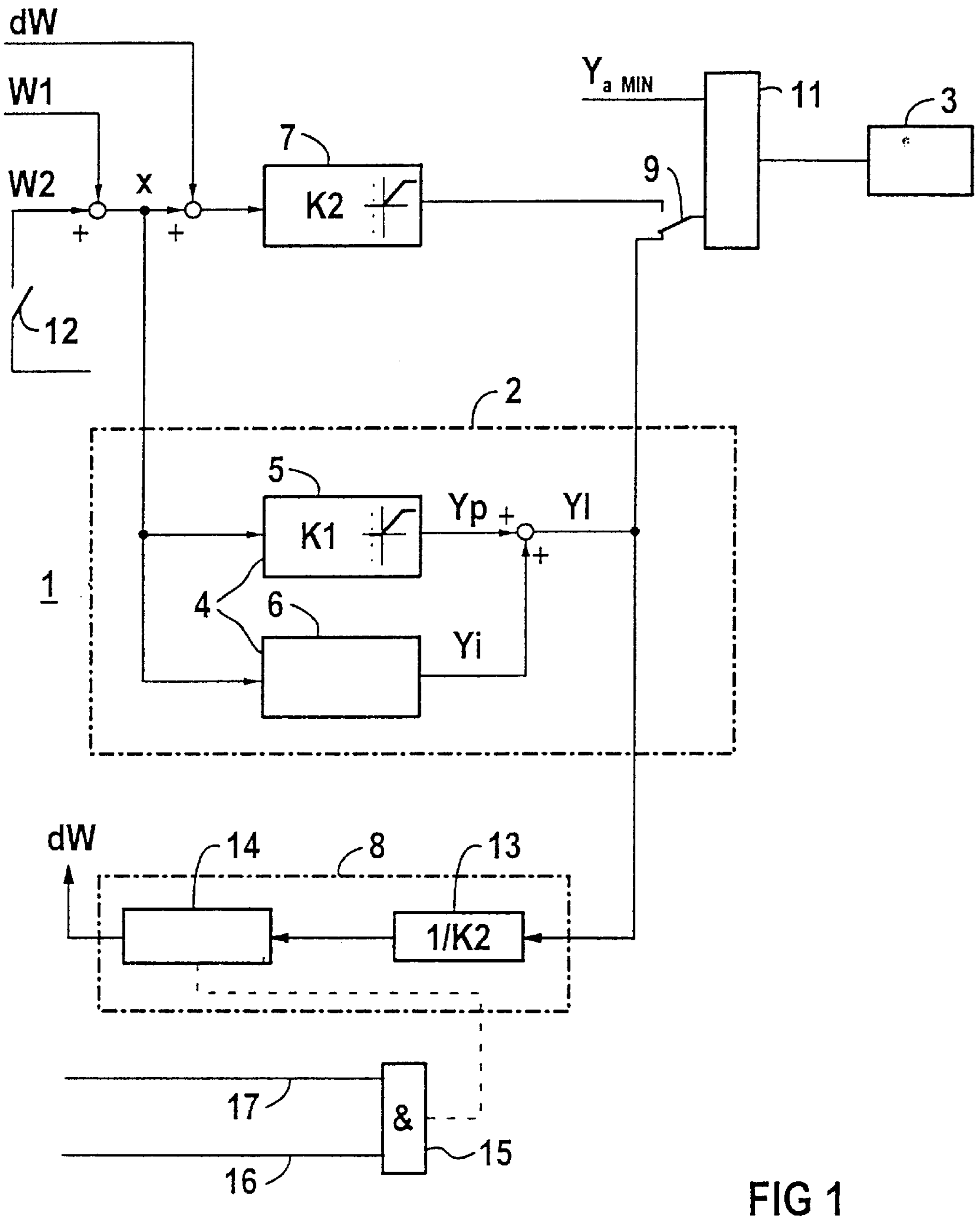
FIG. 1 is a schematic and block circuit diagram of a control system according to the invention.

Referring now to the figures of the drawings in detail and first, particularly, to FIG. 1 thereof, there is seen an illustration of a control system 1 for controlling a gas turbine in network or on-line operation both during load shedding and during idling and/or insular operation. The control system 1 has a first control structure 2, which contains a PI controller 4 that is formed of a P controller 5 (with a proportionality constant Kl) and an I controller 6. The control system 1 furthermore contains a second control structure 7, which has a P controller (with a proportionality constant K2). The first control structure 2 and the second control structure 7 are each connected to a generator circuit-breaker 9, which is connected through a minimum selection device 11 to an actuator 3 for controlling the rotational speed of the turbine. The first control structure 2 is additionally connected on the output side to a correction value structure 8. A limiting signal $Y_{aMIN}$ is furthermore applied to the minimum selection device 11, and limits the drive of the actuator 3.

Power control is carried out through the second control structure 7 during network or system operation of the gas turbine. The circuit-breaker 9 in this case connects the second control structure 7 through the device 11 to the actuator 3. The rotational speed of the gas turbine is thus at its synchronous value. The power control is carried out in such a manner that the second control structure 7 is supplied with a difference x between a setpoint or desired value W2 of the rotational speed and an actual value W1, the synchronous value. This difference value x represents an error or deviation signal. The error signal x is also supplied to the first control structure 2, in addition to the second control structure 7, that is to say to both controllers 5 and 6. This error signal leads to the first control structure 2, which is limited by its limiting value Ylmax, being overdriven. Respective output signals $Y_p$, $Y_i$ of the P controller 5 and of the I controller 6, are added. The sum forms an output signal Yl of the first control structure 2. The output signal $Y_p$ of the P controller 5 corresponds exactly to the limiting value Ylmax of the first control structure 2, through a suitable selection of the proportionality constant Kl of the P controller 5. As a result of the overdriving and/or the selection of the proportionality constant Kl, the I controller 6 integrates towards zero, so that its output value Yi becomes zero. The output value $Yl=Y_p+Y_i$ of the first control structure 2 is exactly YlX. In network operation, the setpoint or required value W2 is at a value which can be set to be fixed or is controllable by a power control system, corresponding to the desired power output from the turbine. The difference between this setpoint value W2 and the actual value W1 is amplified by the P controller 7 and is supplied to the actuator 3. During load shedding, the setpoint value W2 can be preset through a setpoint-value switch 12 at the synchronous rotational speed of the turbine.

The following measures are carried out when load shedding occurs:

The setpoint value W2 of the rotational speed is set to the synchronous value, as a result of which the actual value W1 and the setpoint value W2 correspond, so that the difference x between the two values, that is to say the error signal, is exactly zero. The circuit breaker 9 is switched over, so that the first control structure 2 is connected to the actuator 3.

The control structure 2, which is always in standby during network operation, thus takes over the control of the rotational speed of the gas turbine. Since the error signal X has the value zero immediately after identification of load shedding, an input signal having the value zero is applied to both the P controller 5 and the I controller 6. The output signal $Y_p$ of the P controller 5 is thus likewise at the value zero. The output signal $Y_i$ of the I controller 6 is at the value zero in any case, on the basis of what has been said already. The output signal Yl of the first control structure 2 is thus likewise at the value zero. This value zero is supplied to the actuator 3 as the input signal. This actuator 3 is a control valve, which controls the fuel supply to the gas turbine. In the presence of the "zero" output signal of the first control structure 2, this is a minimal open position which is set in advance. In consequence, the fuel supply is suddenly limited to a mini-mum flow rate required to keep the gas turbine operating. The sudden limiting of the fuel supply results in the rotational speed of the turbine rising to a higher value only briefly, and then falling back below the synchronous value again. This is illustrated diagrammatically and not to scale in FIG. 2.

Figure 2:
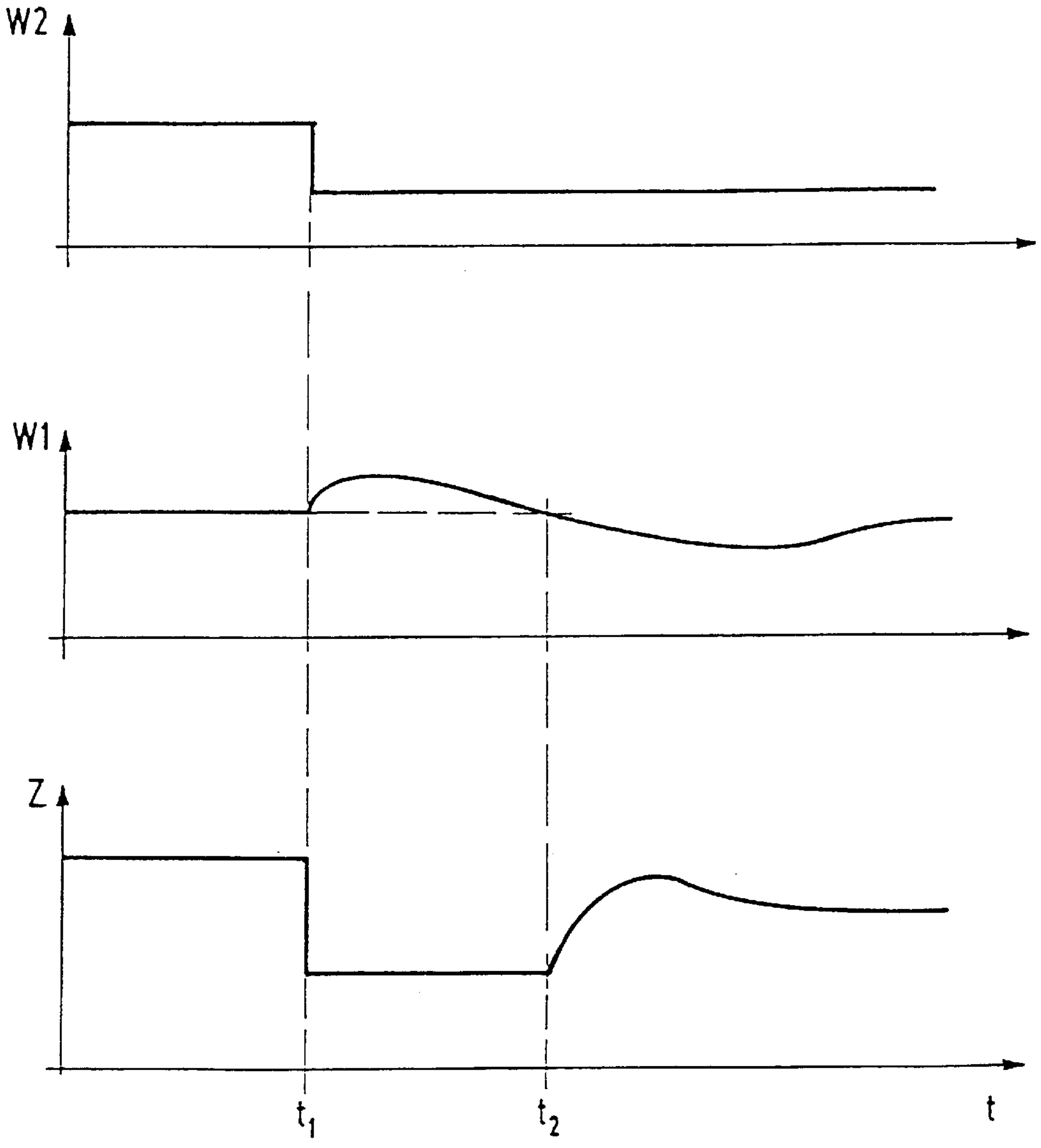
FIG. 2 is a time profile of a setpoint value of a rotational speed, of an actual value of the rotational speed, and of a position of a control valve which is used to control the rotational speed.

FIG. 2 shows a time profile of the setpoint value W2 of the rotational speed, of the actual value W1 of the rotational speed, and of a position Z of the control valve 3, one above the other and not to scale. All three values are constant until a time $t_1$, with the setpoint value W2 of the rotational speed being greater than the actual value (the synchronous value). Upon reaching the time tl, that is to say when load shedding occurs, the setpoint value W2 is suddenly reduced to the synchronous value (corresponding to the actual value W1 at this time). The setpoint value switch 12 is closed for this purpose. In consequence, as described above, the position Z of the control valve 3 likewise changes back, virtually suddenly, to a preset value. After the time $t_1$, the rotational speed W1 rises briefly and then falls again quickly, with the rotational speed W1 falling below the synchronous value again at a time $t_2$. Until this time $t_2$, the position Z of the control valve 3 is limited to the preset minimal value, which is controlled through the first control structure 2. Once the actual value W1 of the rotational speed has fallen below the synchronous value, that is to say the setpoint value W2, the error signal X becomes positive and the first control structure 2 starts to change the position Z of the control valve 3 in such a way that the rotational speed is stabilized at the synchronous value.

The output signal Yl of the first control structure 2 is supplied to the setpoint-value correction structure 8, and a setpoint value correction dW formed therein is supplied additively to the error signal X of the second control structure 7. The error signal X is equal to zero upon reaching the synchronous rotational speed (W1=W2). The structure 8 has a P controller 13, with a proportionality constant 1/K2 which is the reciprocal value of the proportionality constant K2 of the P controller of the second control structure 7. The output value of the P controller 13 is supplied to a holding element 14, which fixes the output value when a non-illustrated network switch and the generator circuit-breaker 9 are switched on simultaneously for network operation of the turbine. A holding signal which is emitted to the holding element 14 is produced through a logic "AND" gate 15, to which a control signal 16, 17 is supplied, corresponding to the respective position of the network switch and of the generator circuit-breaker 9. This results in the output signal of the second control structure 7 being kept continuously at the value of the output signal Yl of the first control structure 2 during idling and/or insular operation of the gas turbine. This thus ensures that, when the circuit-breaker 9 is switched over to network operation, the rotational speed is not changed by switching over and, in particular, no sudden change in the rotational speed occurs.

It is self-evident that the control system 1, the first control structure 2, the correction value structure 8 and the second control structure 7 can be implemented as electrical or electronic components, as integrated circuits and/or software circuits.

The invention is distinguished by the fact that load shedding is coped with without any additional load shedding device. After identification of load shedding, the first control structure takes over control completely. This first control structure is also used to control the rotational speed of the turbine during idling and/or insular operation. The control structure has a PI controller, with an integral element that is forced to the value zero during normal network or on-line operation. This is preferably achieved in such a way that the first control structure is driven continuously during network operation by an error signal which corresponds to the error between a preset setpoint value and the actual value of the rotational speed. This error signal is set to the value zero when load shedding occurs, so that the input signal and the output signal of the first control structure are likewise exactly zero. The output signal of the first control structure is transmitted to an actuator of the turbine, which actuator is used for control of the rotational speed and moves to a preset minimal control position when the output signal having the value zero is present. The control system according to the invention and the method according to the invention ensure that the rotational speed of the turbine remains safely below a critical value, which would cause rapid shutdown, during load shedding.

We claim:

1. A control system for controlling the rotational speed of a turbine for producing electrical power, comprising:

a control structure for receiving an error signal dependent on a difference between a setpoint value and an actual value of a rotational speed, said control structure including a PI controller having a P controller and an I controller, said P controller having a proportionality constant, said control structure including a multiplier producing a product of the proportionality constant and the received error signal, said I controller configured to produce an output approaching zero when said product exceeds a predetermined level; and an actuator to be connected to said control structure for controlling the rotational speed;

said control structure controlling the rotational speed during idle and/or isolated operation of the turbine, and said control structure connected with said actuator and feeding a closing signal to said actuator during load shedding.

2. The control system according to claim 1, including a signal generation unit generating the error signal and resetting the error signal to zero upon identification of load shedding.

3. The control system according to claim 1, wherein said control structure is a first control structure, and including a second control structure, said first control structure and said second control structure supplying)output signals, and including a correction value structure connected to said first control structure and to said second control structure for slaving the output signal of said second control structure to a value of the output signal of said first control structure during idling and insular operation of the turbine.

* * * * *